United States Patent [19]

Bawa

[11] 3,836,698

[45] Sept. 17, 1974

[54] INSULATING SLEEVE FOR METALLIC CONDUIT

[75] Inventor: Jaspal S. Bawa, South Plainfield, N.J.

[73] Assignee: Thomas & Betts Corporation, Elizabeth, N.J.

[22] Filed: Aug. 27, 1973

[21] Appl. No.: 391,749

[52] U.S. Cl. ............................. 174/83, 16/2
[51] Int. Cl. ...................... H02g 3/04, H01b 17/58
[58] Field of Search ..... 174/83, 152 G, 153 G, 167; 16/2, 108, 109; 138/96 R, 96 T

[56] References Cited
UNITED STATES PATENTS

| | | | |
|---|---|---|---|
| 2,249,593 | 7/1941 | Badeau | 174/83 |
| 2,268,060 | 12/1941 | Rhode | 174/83 |
| 3,643,290 | 2/1972 | Milne | 16/2 |

*Primary Examiner*—Laramie E. Askin
*Attorney, Agent, or Firm*—David Teschner; Jesse Woldman

[57] ABSTRACT

An insulating sleeve for metallic conduit comprises a selectively slit tubular body member having a circumferentially disposed rib of preferably triangular cross section disposed adjacent a flared end of the body member and proportioned to have a height adjacent the slit portion of the body member somewhat greater than that along the remainder thereof to provide a generally uniform height about the periphery of the body member as the portion of the body member adjacent the slit is overlapped for insertion into the open end of a metallic conduit or the like. The body member is also selectively proportioned to have a thickness adjacent the slit portion thereof somewhat thinner than its thickness diametrically opposite thereto so that the body member may more closely approximate a circular configuration as it is selectively closed upon itself. The body member may be slit in such manner as to provide an interlocking tang and a tang receiving notch, respectively, adjacent the end of the body member remote from the flared end to prevent longitudinal displacement of the slit edges of the sleeve in use.

9 Claims, 10 Drawing Figures

INSULATING SLEEVE FOR METALLIC CONDUIT

BACKGROUND OF THE INVENTION

1. Field of the Invention

The invention is directed to the field of protective sleeves and principally to an insulating sleeve for metallic conduit or the like.

2. Description of the Prior Art

Prior art insulating sleeves adapted to be inserted into the open end of a metallic cable carrying conduit generally to prevent abrasion of the respective wires of the cable adjacent the exit of the conduit consisted, in many cases, of a split tube formed from an electrically insulating composition stamped into the desired shape and adapted to be radially compressed for insertion into the open end of the metallic conduit. Due to the nature of fabrication, the tube generally comprised a uniform body thickness and a circumferentially disposed rib of uniform height adjacent the flared end of the sleeve, which rib was adapted to be engaged between the conduit and a fitting threaded thereonto to lock the sleeve in place in use. The assembly of the sleeve generally required an overlapping of the sleeve segments adjacent the slit edges of the sleeve to provide a proper fit within the metallic conduit. This arrangement generally presents two separate and distinct problems. Firstly, because of its uniform thickness, there was a tendency for the sleeve to assume a generally elliptical or oval shape when the ends were overlapped, causing an imperfect fit in the conduit. Secondly, that portion of the circumferentially extending rib associated with and situated adjacent the overlapped segment of such sleeve was deflected inwardly to such an extent as to prevent proper engagement within the annular gap separating the conduit from the externally threaded fitting, causing an imperfect lock thereat which often resulted in the sleeve being readily loosened from its desired position in the conduit as the cable wires were drawn therethrough, thereby defeating the purpose of said sleeve as a protective device.

SUMMARY OF THE INVENTION

The invention overcomes the limitations and difficulties noted above with respect to prior art devices by providing an insulating sleeve which is more economical, versatile, and reliable than such prior art devices. The sleeve comprises a generally tubular body member preferably molded from electrically insulating plastic material and selectively dimensioned to have a wall thickness which varies selectively along the circumference of the body member, being thinnest adjacent a longitudinally extending slit extending the length of the body member and thickest at a point generally diametrically opposite said slit, so that the sleeve may more closely approximate a circular configuration when its ends are overlapped for insertion into a metallic conduit or the like. To lock the sleeve into position adjacent the tapered end of the metal conduit to which has been threadably attached an end fitting, there is provided a circumferentially extending rib selectively spaced from the flanged end of the sleeve and having a variable height arranged to provide more uniform engagement within an annular recess located between the end fitting and the metallic conduit. The rib is provided with a slightly greater height adjacent the slit portion of the sleeve than along the remainder thereof to adjust for the height lost when the free ends of the sleeve are overlapped to conform to the internal diameter of the metal conduit into which the sleeve is inserted. The longitudinally extending slit is selectively formed so as to provide an interengaging tang and tang receiving notch adjacent the end of the insulating sleeve remote from the flanged portion thereof, said tang and tang receiving notch serving to provide a lock for the sleeve in its overlapped configuration to restrict longitudinal displacement thereof when subjected to the forces of one or more cable wires being pulled therethrough. The aforementioned rib may be either contiguously formed to encompass a predetermined arc about the body member or, in another embodiment, may be formed of disconnected segments encompassing substantially the same arc. It is therefore an object of this invention to provide an improved insulating sleeve.

It is another object of this invention to provide a molded plastic insulating sleeve.

It is a further object of this invention to provide an improved, variable diameter insulating sleeve structured to provide a generally circular configuration throughout its range of adjustment.

It is still another object of this invention to provide an improved, variable diameter insulating sleeve having a circumferentially extending rib proportioned to provide a generally uniform height along its length throughout the range of adjustment of the sleeve.

It is still a further object of this invention to provide an improved insulating sleeve having a body member having a circumferentially varying wall thickness.

Other objects and features of the invention will be pointed out in the following description and claims and illustrated in the accompanying drawings, which disclose by way of example, the principle of the invention and the best mode contemplated for carrying it out.

BRIEF DESCRIPTION OF THE DRAWINGS

In the drawings

Similar elements are given similar reference characters in each of the respective figures.

DESCRIPTION OF THE PREFERRED EMBODIMENTS

Figure 6:
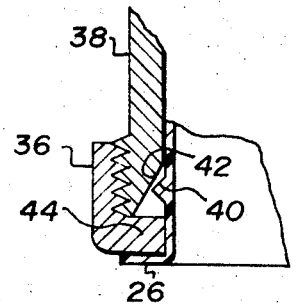
FIG. 6 is a fragmentary view, partly in section, showing a portion of the device of FIG. 1 installed adjacent one end of a terminated metallic conduit.
Figure 7:
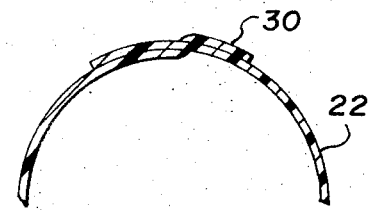
FIG. 7 is a fragmentary sectional view taken along the line 7—7 of FIG. 5.

Turning now to FIGS. 1, 2, 3, 4, and 5 there is shown an insulating sleeve 20 constructed in accordance with the concepts of the invention. Sleeve 20 comprises a generally tubular body member 22 having a slit 24 extending longitudinally between a first end 26 and a second end 28 of the body member 22 to provide an open sleeve construction essentially as shown, thereby permitting the edges of the body member 22 generally adjacent the slit 24 to be overlapped for insertion into a metal conduit or the like. The slit 24 is selectively configured so that a tang 30 and a tang receiving notch 32 are provided adjacent the second end 28 of the body member 22. The tang 30 is arranged to overlap and interengage with the tang receiving notch 32 when the body member 22 is radially compressed to cause the free edges adjacent the slit 24 to overlap, as shown more clearly in FIG. 7. In this manner the free edges of the body member 22 adjacent the slit 24 are thus effectively locked together and restrained from longitudinal displacement with respect to one another when assembled within the enclosure (not shown). Adjacent the first end 26 of body member 22 is a flanged portion 34 adapted to seat against an end fitting 36 (FIG. 6) threadably attached to a metal conduit 38 into which the sleeve 20 has been inserted. Encircling the body member 22 is a rib 40 disposed generally adjacent the first end 26 of body member 22 and spaced a short distance from the flanged portion 34. As may be more clearly seen in FIG. 6, the rib 40 is arranged to enter an annular recess situated between the tapered portion 42 of the metal conduit 38 and the overhanging shoulder 44 of the end fitting 36 to prevent inadvertent removal of the sleeve 20 from the end of the metallic conduit 38.

Figure 1:
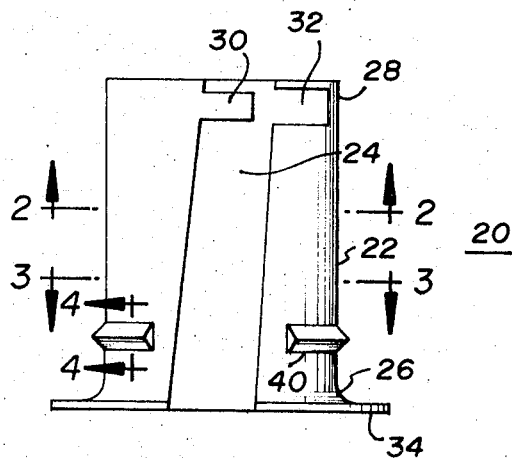
FIG. 1 is a top plan view of an insulating sleeve constructed in accordance with the concepts of the invention.
Figure 2:
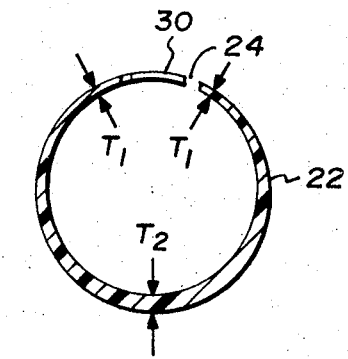
FIG. 2 is a sectional view of the device of FIG. 1 taken along the line 2—2 of FIG. 1.
Figure 3:
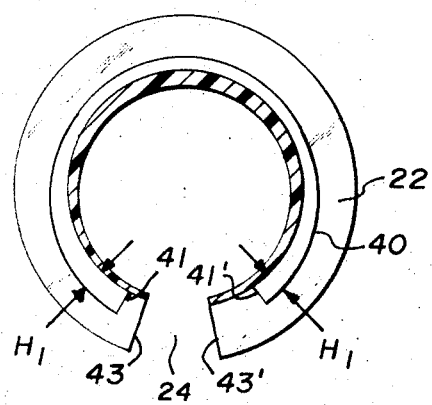
FIG. 3 is a sectional view of the device of FIG. 1 taken along the line 3—3 of FIG. 1.
Figure 4:
FIG. 4 is a fragmentary sectional view of a portion of the device of FIG. 1 taken along the line 4—4 of FIG. 1.
Figure 5:
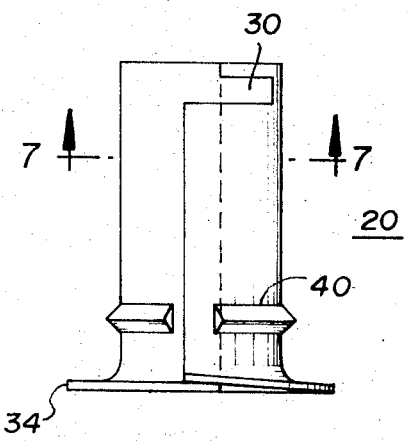
FIG. 5 is a top plan view of the device of FIG. 1 in a partially closed state.
Figure 8:
FIG. 8 is a fragmentary sectional view showing a further embodiment of a rib profile of an insulating sleeve constructed in accordance with the concepts of the invention.
Figure 9:
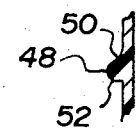
FIG. 9 is a fragmentary sectional view of another embodiment of a rib profile of an insulating sleeve constructed in accordance with the concepts of the invention.
Figure 10:
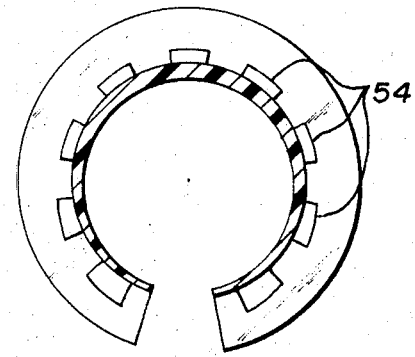
FIG. 10 is a front elevational view, partly in section, of a further embodiment of an insulating sleeve constructed in accordance with the concepts of the invention.

Referring now specifically to FIG. 2, the wall thickness of the body member 22 varies circumferentially from a relatively thin section generally adjacent the edges bordering the slit 24 and indicated generally as $T_1$, to a maximum thickness indicated generally as $T_2$ at a point substantially diametrically opposite the slit 24. This construction permits the insulating sleeve 20 to be formed into a configuration more closely approximating a circular transverse cross section when the edges of the sleeve adjacent the slit 24 are overlapped. It has been found, for example, that where the body member was formed with a uniform wall thickness, its closed shape, in transverse cross section, deviated substantially from an ideal circular shape, resulting in a gap between the outer surface of the sleeve and the inner surface of the metallic conduit. In radially compressing a split sleeve of uniform wall thickness, the portion of the sleeve generally diametrically opposite the slit tends to deform to a greater extent than that portion adjacent the slit, so that the final shape more closely approximates a tear-drop transverse cross section. Consequently, wires inserted through the metallic conduit would tend to enter the resulting gap between the sleeve and the conduit, thereby seriously interfering with the proper advance of the wires through the metallic conduit. It has been found that the wall thickness $T_2$ may vary from a value approximately 50 percent greater than the wall thickness $T_1$ to a value approximately twice that of $T_1$. Thus, for example, an insulating sleeve, according to the instant invention and designed for insertion into a metallic conduit having, for example, a one inch internal diameter, may have a wall thickness $T_2$ of approximately 0.040 inch while the wall thickness $T_1$ may be in the order of from 0.020 inch to 0.030 inch. It will of course be readily appreciated by those skilled in the art that the variation in the wall thickness of the body member 22 will depend somewhat on the type of material employed and the degree of closure required to insert the sleeve 20 into a metallic conduit of a particular internal diameter. For example, the greater the degree of closure required the greater will be the tendency of a uniformly dimensioned sleeve to assume an increasing non-circular configuration requiring, therefore, a greater difference between the thicknesses $T_1$ and $T_2$. Conversely, where less closure is required, the difference between the thicknesses $T_1$ and $T_2$ may, accordingly, be less than in the former case. The rib 40, as shown in greater detail in FIG. 3, is provided with a height $H_1$ generally adjacent the terminating ends thereof which is greater than the height of the remaining length of the rib 40. The height of the rib 40 decreases preferably in a gradual slope which may encompass approximately 15° to 30° of arc, more or less, taken along the circumference of the sleeve 20. The particular arc length employed should preferably correspond closely to the arc length between the ends of the rib 40 designated as 41, 41' in FIG. 3, and the associated free edge of the body member 22 designated respectively as 43, 43' in FIG. 3. Thus, as the edges of the body member 22 are overlapped, the outer surface of that portion of the body member 22 lying under the opposing portion will have been radially depressed inwardly an amount approximately equal to the wall thickness of the body member in that general area. The increased height of the rib 40 in the general area of overlap will make up for the decrease in radial distance from the longitudinal axis of the body member 22 to rib 40 thereat so that, in essence, a rib of apparent uniform height is presented for engagement with the associated recess formed between the metallic conduit 38 and the end fitting 44. Accordingly, there is no loss of locking engagement due to the overlapping of the respective free edges of the body member 22. The rib-less zone provided between the free edges 41, 41' of the rib 40 and the associated free edges 43, 43' of the body member 22 permits the portion of the body member 22 thereat to be intimately overlapped without interference from the rib 40. As illustrated in greater detail in FIG. 4, the rib 40 has a generally triangular cross section to enhance the entry and removal of the sleeve 20 into and from, respectively, the assembly consisting of the metallic conduit 38 and the end fitting 36. It should be noted that the rib 40, when formed as by molding, or the like, merely comprises an addition to the wall thickness of the body member 22 in the area immediately under the rib 40, preserving the strength thereat, contrary to the diminished cross section generally found in prior art stamped sleeves wherein a locking rib is formed by deforming a portion of the body member thereat, thereby weakening the body member in the general area of the rib. The generally triangular rib cross section shown in FIG. 4 may, alternatively, be modified to provide a generally sawtooth rib cross section, indicated at 46 as shown in FIG. 8. This shape may be found advantageous for increasing the force required to separate the sleeve from the end of the assembled conduit 38 and end fitting 36. In a further embodiment illustrated in FIG. 9, a rib 48 is shown as having a selectively curved contour on one side thereof, as at 50, while the opposing side 52 is formed generally perpendicular to the longitudinal axis of the sleeve 20 to decrease the insertion force without materially effecting the locking engagement of the sleeve within the conduit assembly. The rib 40, although shown as extending contiguously about the periphery of the body member 22, (See FIG. 3), may be segmented, as shown for example in FIG. 10, to provide a series of rib segments 54. Thus, the stiffening effect of a contiguous rib such as 40 may be reduced to permit the sleeve 20 to be more readily compressed into the desired size.

The embodiments of the invention in which an exclusive property or privilege is claimed are defined as follows:

1. An insulating sleeve for metallic conduit comprising: a tubular body member formed from electrically insulating material and having a first end and a second end, said first end and said second end defining therebetween the length of said body member, there being a selectively formed slit extending the length of said body member to permit said body member to be at least partially closed upon itself for insertion into one end of a metallic conduit, said body member having a wall thickness varying circumferentially from a given minimum wall thickness generally adjacent either side of said slit to a given maximum wall thickness at a point generally diametrically opposite to said slit; a flanged portion extending circumferentially about said first end of said body member; and a selectively formed rib extending generally circumferentially about said body member a predetermined distance from said first end thereof, said rib having a height above the outer surface of said body member generally adjacent said slit which is greater than its height along the remainder of the length of said rib.

2. An insulating sleeve as defined in claim 1 wherein said rib terminates in ends spaced a predetermined distance from either side of said slit to provide a rib-less zone thereat to permit said body member to be smoothly over-lapped at said rib-less zone.

3. An insulating sleeve as defined in claim 1 wherein said slit extends circumferentially through a first given arc and then longitudinally a first given distance adjacent said second end of said body member to provide a tang and a tang receiving notch, respectively, adjacent said body member second end.

4. An insulating sleeve as defined in claim 1 wherein said rib has a generally triangular cross section.

5. An insulating sleeve as defined in claim 1 wherein said rib has a generally saw-tooth cross section.

6. An insulating sleeve as defined in claim 1 wherein said rib extends contiguously along its entire length.

7. An insulating sleeve as defined in claim 1 wherein said rib comprises a plurality of disconnected segments.

8. An insulating sleeve as defined in claim 1 wherein the maximum rib height generally adjacent said slit is greater than the rib height along the remainder of the length of said rib by an amount generally equal to the thickness of said body member generally adjacent said slit.

9. An insulating sleeve as defined in claim 1 wherein said body member given maximum wall thickness is at least approximately 50 per cent greater than said body member given minimum wall thickness.

* * * * *